Dec. 5, 1950 W. G. SMITH 2,532,344
FEED SCREW MOUNTING FOR PERCUSSION DRILLS
Filed June 1, 1948

INVENTOR
WILLIAM G. SMITH
BY
G. F. McDougall
ATTORNEY

Patented Dec. 5, 1950

2,532,344

UNITED STATES PATENT OFFICE 2,532,344

FEED SCREW MOUNTING FOR PERCUSSION DRILLS

William G. Smith, Portland, Oreg.

Application June 1, 1948, Serial No. 30,365

2 Claims. (Cl. 287—85)

This invention relates to a shock absorbing mounting, of resilient rubber, for the feed screw nut of a percussion rock drill.

Rubber shock absorber mountings are old and well known; yet in the present situation the shocks are so severe and the required length of feed screw nut and the length part of the screw threaded therethrough are such that nothing really satisfactory has been developed that is commercially available.

The object of the invention may be stated to be a satisfactory rubber shock absorber for the nut of a feed screw on a percussion drill.

The invention is delineated in a drawing that accompanies and forms a part hereof, in which.

Figure 1:
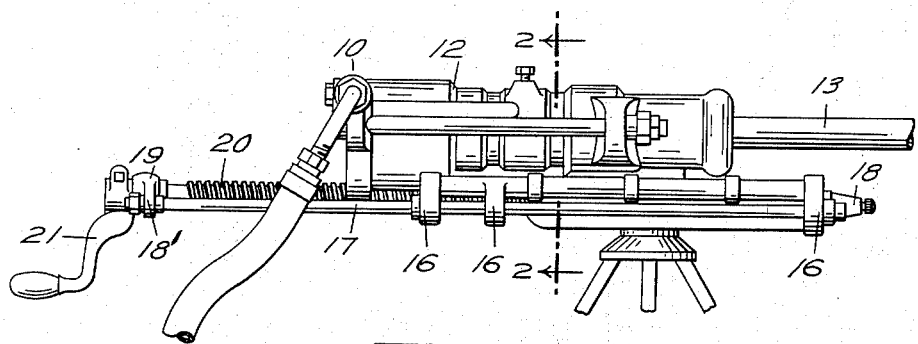
Fig. 1 is a general drawing of a percussion rock drill of the type requiring a feed screw, which a smaller jackhammer does not.
Figure 2:
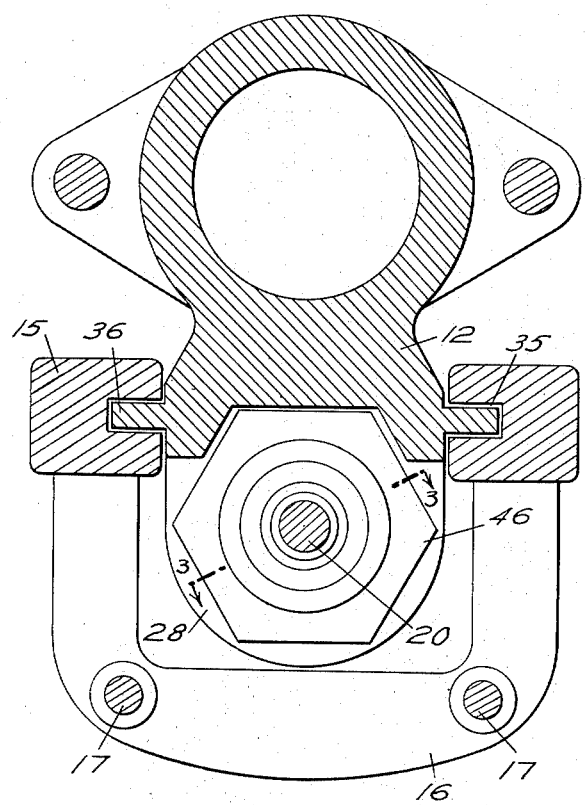
Fig. 2 is a section taken on the plane 2—2 of Fig. 1.

Describing the structure shown in detail, numeral 12 represents the body of a percussion rock drill, operated by compressed air through a hose connection 10, to drive a drill 13, into a rock face, usually for blasting. The drill 12 is furnished with slides 36, that operate in guides 35. A dependent clamping portion 28 is formed integral with the drill body 12, and provided with a bore 142 for the sleeve 25, that contains the nut 40, the sleeve being lined with the rubber cushion 41, that is vulcanized to it. This rubber is also vulcanized to the outside of the nut 40, meaning to all parts of the inside surfaces shown in Fig. 3 save that it does not extend up into the slots 43, especial provision to prevent which will be necessary in performing the vulcanizing job. There is a shoulder 45 on one end of the sleeve 25, and it is securely held within the clamping portion 28, by the nut 46, the thickness of the sleeve at the points where the slots 43 are located being sufficient to provide room for the rubber to move into them as will be explained hereinafter. A frame 18 is suitably carried by the body 12 and has guides 16 formed thereon slidable over the rods 17 to support the body of the drill 12, so that bending stresses need not be supported by the feed screw 20. These rods 17 also support the head 19, which has lugs 18'. The feed screw 20 is turned to move the drill body 12 by the handle 21 as drilling progresses.

The shock and vibration accompanying the operation of a percussion drill probably exceeds that of any other machine of anything like comparable weight, and feed screws and nuts, especially the latter which are quite expensive, have to be renewed frequently, are difficult to lubricate because the shock loads destroy any oil film that can be applied, and when bruised by the concussion are difficult to operate.

The principle of the invention will now be explained. Rubber, while a synonym for elasticity, is less compressible than water when confined. It moves easily by elastic flow under stress, but only if it has a place to move to.

Figure 3:
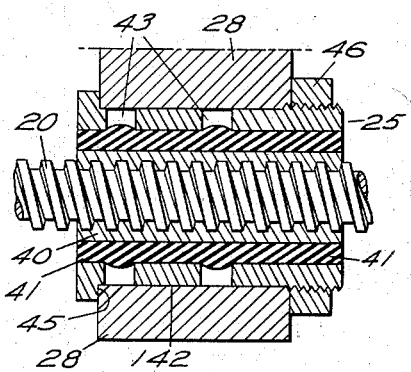
Fig. 3 is a section taken on the plane 3—3, Fig. 2.
Figure 4:
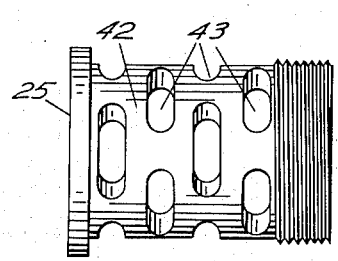
Fig. 4 is a side elevation of the slotted sleeve, within which the rubber cushion is vulcanized to complete the invention.

Considering the structure shown in section in Fig. 3, without the slots 43, the rubber lining 41, vulcanized to both parts, would be little more of a shock absorber than so much soft Babbitt metal. The following is my solution.

By making the nut 40 tubular and vulcanizing the resilient rubber 41 to the outside surface, the nut moves in a relatively straight line and does not apply any twisting or bending moment to the screw 20. By making the total area of the circumferential slots 43 and the lands 42 between them of approximately the same area, by staggering them and further by having a complete cylindrical portion of rubber at each end, the cylindrical parts of rubber at each end compensate for the inescapable tendency of the staggered slots to divert the shock reaction out of a straight line, the rubber finds a place to move into, and with the circumferential slots the resiliency of the rubber cushion 41 will be several times greater than if the slots were, for example, longitudinal and of equal number and proportionate area. It is to be observed that the drill vibrates and with it the sleeve, the nut remaining stationary, if it will.

Having disclosed my invention and explained its principle, what I claim as new and desire to secure by Letters Patent, is:

1. In a shock absorbing nut mounting for the feed screw of a percussion drill, a uniform outer surface for the nut, a sleeve therefor substantially larger in internal diameter than the diameter of the nut, characterized by said sleeve being provided with a plurality of staggered circumferential through, elongated slots, the slotted area being spaced from each end of the sleeve and the total area of the slots being of the same general order as that of the lands between them, and a resilient rubber cushion between the nut and the sleeve and firmly vulcanized to both parts leaving the slots of the sleeve unfilled with rubber.

2. A shock absorber mounting for a feed screw nut in percussion drills or the like comprising a slotted sleeve provided with a plurality of rows of circumferential slots, staggered as to adjacent rows, said rows being spaced from both ends of said sleeve, an axially disposed nut within the sleeve and having an overall length as great as the sleeve, and a resilient rubber cushion between the inside of the sleeve and the outside of the nut, said cushion being securely vulcanized to both the sleeve and the nut leaving the slots of the sleeve unfilled with rubber.

WILLIAM G. SMITH.

REFERENCES CITED

The following references are of record in the file of this patent:

UNITED STATES PATENTS

| Number | Name | Date |
|---|---|---|
| 1,786,719 | Dippman et al. | Dec. 30, 1930 |
| 1,917,644 | Guy | July 11, 1933 |
| 1,940,302 | Humphrey et al. | Dec. 19, 1933 |
| 1,993,260 | Burns | Mar. 5, 1935 |
| 2,088,798 | Leighton | Aug. 3, 1937 |
| 2,103,729 | Leighton | Dec. 28, 1937 |
| 2,207,831 | Sherman | July 16, 1940 |
| 2,341,821 | Schwinn | Feb. 15, 1944 |

FOREIGN PATENTS

| Number | Country | Date |
|---|---|---|
| 794,208 | France | Feb. 11, 1936 |